United States Patent [19]
Idel

[11] 3,918,324
[45] Nov. 11, 1975

[54] MASTER FORM DEVICE FOR METAL-WORKING MACHINE TOOLS

[76] Inventor: Vladimir Viktorovich Idel, ulitsa Gertsena 3, kv. 37, Zavolzhie Gorkovskoi oblasti, U.S.S.R.

[22] Filed: Nov. 12, 1973

[21] Appl. No.: 414,771

Related U.S. Application Data

[63] Continuation of Ser. No. 300,370, Oct. 24, 1972, abandoned.

[30] Foreign Application Priority Data
Jan. 28, 1972   U.S.S.R.............................. 1738830

[52] U.S. Cl................ 74/568 FS; 74/568 R; 82/19
[51] Int. Cl.² ........................................ F16H 53/04
[58] Field of Search .......... 74/568 FS, 568 R; 82/19

[56]          References Cited
         UNITED STATES PATENTS
2,322,031   6/1943   Kuebert........................... 74/568 FS
2,409,130   10/1946   Lear................................ 74/568 FS
2,869,058   1/1959   Poland............................ 74/568 FS
3,298,246   1/1967   Rubinwitch ..................... 74/568 FS FOREIGN PATENTS OR APPLICATIONS
980,280   5/1951   France............................ 74/568 FS Primary Examiner—Samuel Scott
Assistant Examiner—F. D. Shoemaker
Attorney, Agent, or Firm—Holman & Stern

[57]           ABSTRACT

A curvilinear guide member of a master form device is adjustably mounted on a base to change the shape of the guide member, the guide member being essentially a cable which is run over by a follower roller associated with a working member.

5 Claims, 3 Drawing Figures

MASTER FORM DEVICE FOR METAL-WORKING MACHINE TOOLS

This is a continuation of application Ser. No. 300,370, filed Oct. 24, 1972, now abandoned.

BACKGROUND AND SUMMARY OF THE INVENTION

The present invention relates to machine tools, and more specifically to master form devices of such machine tools to be used for controlling the feed of working members of these machine tools.

The master form device according to the present invention may be most advantageously used for controlling the working member of machine tools for setting sawteeth, such as for controlling a saw feed in conformity with the pitch in a setting mechanism.

Master form devices for copying milling machines having a curvilinear guide member fixed to a flat base by means of support members are known. These support members are adjustable to change the shape of the curvilinear guide member. Said curvilinear guide member engages a follower roller, which is in force-transmitting connection with a working member.

The above-mentioned curvilinear guide member comprises a flexible rod or a flexible band.

The use of curvilinear guide members made of flexible rods or bands does not permit the changing of the shape of these guide members, since frequent bendings of the rod (band) when changing for machining workpieces of another size on a given machine tool result in a reduction of the service life of these guide members, especially with considerable cross sectional dimensions and small length of the rod (band).

It is an object of the present invention to increase the service life of curvilinear guide members.

In accordance with the above object there is provided a master form device for machine tools, wherein a curvilinear guide member cooperating with a follower roller associated with a working member is secured on the base by means of support members which are adjustable to change the shape of the guide member, and wherein according to the invention said curvilinear guide member is essentially a cable.

It is advantageous that the cable have an elastic coating in order to provide an even and continuous surface.

This coating ensures uniform transmission of motion to the working member without pulsation or vibration, which is particularly important for machining workpieces to a high degree of precision.

It is also advantageous that the support member, supporting the most distant portion of the cable, intermediate its length at the point of its bending, be provided with a groove to accommodate the cable, one side of the groove projecting beyond the cable and functioning as a guide portion of the curvilinear guide member.

This embodiment of the support members ensures the protection of the cable against failure at the most heavily loaded portions of the guide member.

The master form device of a machine tool for setting sawteeth according to the invention is reliable and durable in operation and ensures high precision of motion transmission to the working member.

In addition, the guide members which are made as a cable can be mounted on a base having substantially any shape.

BRIEF DESCRIPTION OF THE DRAWINGS

The invention will now be described in detail with reference to the accompanying drawings, in which.

DESCRIPTION OF THE PREFERRED EMBODIMENTS

Figures 1, 2, 3:
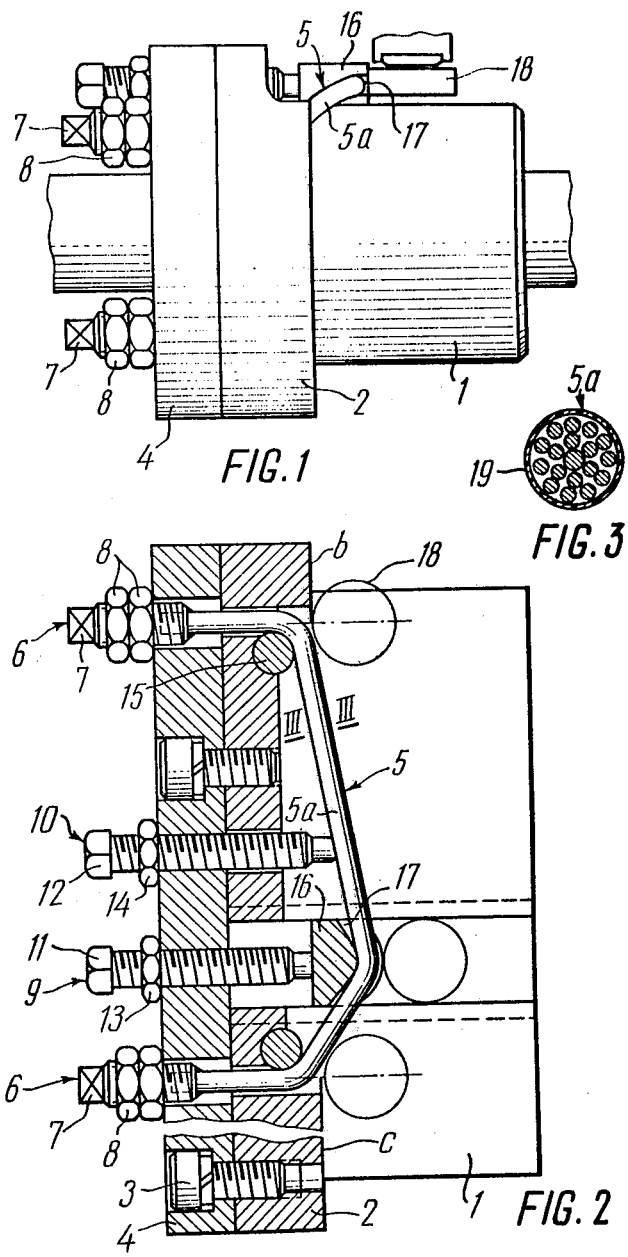
FIG. 1 shows a general view of a master form device according to the present invention.
FIG. 2 is a an enlarged developed view of the master form device partly in section taken along the support members.
FIG. 3 is a cross sectional view taken along the line III—III in FIG. 2.

The master form device comprises a cylindrical base 1, as shown in FIGS. 1 and 2, provided with a shoulder 2 at one end thereof. This shoulder is adapted to fix the base 1 by means of screws 3 to a shaft 4.

Mounted on the cylindrical base 1 is a curvilinear guide member 5 adapted to control the feed of a saw (not shown) in conformity with the pitch in a sawteeth setting mechanism of a machine tool (not shown) for setting teeth of band saws. The curvilinear guide member 5 comprises portions $b$ and $c$ of the end face of the shoulder 2 and a flexible cable 5a. The use of the flexible cable 5a as guide member allows for a considerable number of changes in the shape of the curvilinear guide member 5 in making sawteeth settings with different pitch.

The ends of the cable 5a are fixed to the shaft 4 by means of support members 6 each comprising a bolt 7 with nuts 8. A desired shape of the curvilinear guide member 5 along the entire length thereof is maintained by means of support members 9 and 10 each comprising bolts 11, 12 and nuts 13, 14 respectively. The support members 6, 9, 10 permit the changing of the shape of the curvilinear guide member 5a depending upon the pitch of the saw to be set.

Support members 15 are required for technological purposes in order to simplify the rounding of the shoulder edges.

The support member 9 supports the cable 5a at the intermediate point which is the most distant from the shoulder 2. This support member is provided at the end thereof with a flat portion 16 in which is formed a groove 17 (FIG. 1) shaped to accommodate the cable 5a.

The depth of the groove 17 is greater than the diameter of the cable 5a thereby ensuring the accommodation of the latter in the former. In the embodiment herein described the opposite sides of the groove 17 have an equal length, and one of them — the upper one — functions as a curvilinear portion of the guide member 5 cooperating with a follower roller 18 associated with a working member (not shown) of the machine tool.

This embodiment of the support member 9 allows for unloading of the cable 5a at the most heavily loaded point of the guide member and, therefore, to increase the service life thereof.

Only one of the lateral sides of the groove may project, this side being run over (engaged) by the follower roller 18 associated with the working member of the machine tool. The end portions of the lateral sides of the groove 17 make smooth transition into the surface of the cable 5a which is run over (traversed) by the follower roller 18.

The portions *b* and *c* of the end face of the shoulder 2 form a part of the curvilinear guide member 5, as previously stated. When changing the shape of the guide member 5, these portions have the constant shape of a circle.

As shown in FIG. 3, the cable 5*a* is provided with a layer 19 of an elastic coating, such as Nylon-6. This coating provides an even, continuous surface of the cable 5*a* which ensures uniform transmission of motion to the working member without vibration.

The master form device of the machine tool for setting sawteeth functions as follows:

The shaft 4 rotated by a drive (not shown) rotates the base 1, and the follower roller 18 runs over the portions *b* and *c* of the shoulder 2, the surface of the cable 5*a* and the projecting flat portion 16 of the support member 9.

Thin lines in FIG. 2 show the trace of the follower roller 18. From the roller 18 the motion is transmitted to the working member (now shown).

When it is necessary to change the setting of the teeth of a saw having a greater (or smaller) pitch, the curvature and the distance at which the bending point of the cable 5*a* is spaced from the shoulder 2 must be changed. In order to do so, the nuts 8, 13 and 14 of the bolts 7, 11, 12 respectively are loosened, the bolt 11 is displaced into a predetermined position and fixed by means of the nut 13. Then the cable 5*a* is tensioned by means of the bolts 7 and is acted upon by the bolt 12 which is fixed by means of the nut 14.

What is claimed is:

1. An adjustable master form device for controlling a working member of a machine tool comprising:
   a base (1) including a shoulder (2);
   a curvilinear guide member on said base and including a flexible fixed-length cable defining a guide profile for engagement by a follower roller operatively connected with and operating a working member;
   support members projecting from said shoulder beneath said cable and anchoring opposite ends of said cable on said base shoulder,
   said support members including adjustable means for changing the profile of the fixed-length flexible cable.

2. A master form device as claimed in claim 1, wherein the fixed-length cable is provided with an elastic coating for providing an even and continuous transitional surface between the cable profile and the shoulder.

3. A master form device as claimed in claim 1, including one adjustable support member intermediately engaging the flexible fixed-length cable at an intermediate bend portion of the cable where the profile defined thereby changes direction, said one support member including a groove portion accommodating the intermediate portion of the cable at its change of direction, said support member groove portion including one side portion projecting beyond the cable profile and functioning as a guide portion of the curvilinear guide member, end portions of the one side portion merging into the cable profile for providing smooth transition into the cable profile cooperating with a follower roller.

4. A master form device as claimed in claim 3 including a second adjustable support member extending from said shoulder in spaced relation from said one support member for maintaining the cable profile in a relatively fixed adjusted position.

5. A master form device as claimed in claim 3 including support members (15) extending transversely beneath said cable adjacent opposite ends of said cable profile supporting bend portions of said cable adjacent said base shoulder.

* * * * *